United States Patent Office 3,541,138
Patented Nov. 17, 1970

3,541,138
CROSSLINKING POLYMERIZABLE SURFACTANTS
William D. Emmons, Huntingdon Valley, and George A. Frank, Fort Washington, Pa., assignors to Rohm and Haas Company, Philadelphia, Pa., a corporation of Delaware
No Drawing. Filed Mar. 20, 1967, Ser. No. 624,152
Int. Cl. C07c 69/52
U.S. Cl. 260—485       5 Claims

ABSTRACT OF THE DISCLOSURE

This invention relates to crosslinking polymerizable nonionic and anionic emulsifying agents having both a hydrophilic ester radical portion and a hydrophobic ester radical portion. The emulsifying agents are chemically bound to the polymer in such a manner as to prevent migration of the emulsifying agent on coagulation, and provide an internally stabilized polymer. The polymerizable emulsifying agents of this invention are $\alpha,\beta$-unsaturated dicarboxylic acid substituted esters having a hydrophilic portion alpha to or conjugated with a polymerizable double bond and a hydrophobic ester radical portion beta to or unconjugated with the polymerizable double bond. Polymer dispersions formed according to this invention may be used in the preparation of coating, impregnating and binding compositions.

---

This invention relates to novel crosslinking anionic and nonionic surface active compounds having both a hydrophilic radical portion and a hydrophobic ester radical portion, to methods for their preparation, and to internally stabilized homopolymers and copolymers formed therefrom. In particular this invention relates to polymerizable $\alpha,\beta$-unsaturated dicarboxylic acid substituted esters having an internal structural mechanism for predetermining their hydrophile-lyophile balance and capable of polymerically combining with copolymerizable ethylenically unsaturated compounds dispersed in an aqueous medium to provide a very stable latex containing polymer particles comprising the polymerizable surfactant as an immobile integral component of the polymer.

The advantages of using an emulsifying agent that is bound to the polymer in such a manner as to prevent migration of the dispersing agent on coagulation and thus avoid the difficulties encountered in the use of soap as an emulsifying agent are described in U.S. Pat. 2,868,755. Emulsifying agents such as soap have been extensively used in water as a dispersing agent. Suitable initiating agents are added to an emulsion of the monomer in water, which results in the formation of polymer particles, which are protected from coagulation by a layer of adsorbed emulsifying agent. The suspension of such protected polymer particles is termed a synthetic latex. The emulsifying agent thus functions initially to dissolve the monomer in the micelles formed in the dispersing medium and subsequently to protect the polymer so formed.

Soaps, such as potassium laurate and sodium abietate, etc. are in no case chemically bound to the polymer particles but are simply adsorbed on the surface of the polymer particles, and when the resulting latex is coagulated, as for example by adding acids or multi-valent cations, the emulsifying agent contributes little to the strength or adhesion of the coagulated polymer, but instead may itself, or from the decomposition products formed, continue to protect the particles from one another in the coagulum. The reaction product of the emulsifying agent with certain coagulating agents migrates within the solid polymer to form aggregates which further weaken the mechanical properties of the polymer. When the latex is evaporated as a film, migration of the emulsifying agent to the surface of the film has a deleterious effect upon several properties such as adhesion and resistance to water spotting.

The prior art discloses the use of sulfo-esters of monocarboxylic acids of the formula

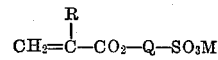

where R is hydrogen, a halogen atom or an organic radical, is a bivalent organic radical having its valence bonds on two different carbon atoms, such as alkylene radical, and M is hydrogen, an ammonium base or a metal, to form addition polymers with different polymerizable ethylenically unsaturated compounds. It has been disclosed that the incorporation of the carboxylic acid sulfo-ester in a hydrophobic ethylenically unsaturated monomer provides a copolymer having an increase in hydrophilic properties. The degree of variation of the hydrophilic properties is directly related to the percent by weight of the carboxylic acid sulfo-ester in the monomer mixture.

In accordance with this invention it has been discovered that certain crosslinking polymerizable ethylenically unsaturated compounds comprising hydrophilic sulfoester radical portions, or polyoxyalkyl portions, in an alpha or conjugated relationship to a polymerizable double bond together with a crosslinking hydrophobic ester radical portion in a beta or unconjugated relationship with the polymerizable double bond of the formula

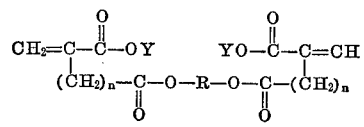

wherein $n$ is 1 or 2, R is a $C_2$ to $C_{24}$ divalent alkyl radical or a radical of the formula

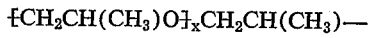

wherein $x$ is an integer from 1 to 29, and Y is a radical selected from $\text{-(CH}_2\text{)}_m\text{SO}_3\text{M}$ or $\text{-(CH}_2\text{CH}_2\text{O)}_{m'}\text{H}$, where $m$ is an integer from 2 to 4, $m'$ is an integer from 1 to 50 and M is hydrogen or an alkali metal, can be structurally adapted to provide a predetermined hydrophile-lyophile balance merely by changing the structure of the hydrophobic ester radical R which is bound to the carboxyl group beta to or unconjugated with the polymerizable double bond, or by changing the structure of the hydrophilic ester radical Y which is bound to the $\alpha$-carboxyl group. The net balance of the hydrophilic properties imparted by the Y substituent and the hydrophobic properties imparted by the R substituent may be predetermined by carefully selecting and varying the R or Y substituents.

The compounds of this invention may be sequentially prepared because of the substantial differential in reactivity of the carboxyl groups in the conjugated and unconjugated positions of the dicarboxylic acids used as starting materials. For example, itaconic acid possesses one carboxyl group that is more susceptible to a nucleophilic attack than is the other carboxyl group. Two moles of the dicarboxylic acid are reacted with a diol to form the bis-ester of the diol. In the case of itaconic acid, the alkyl bis-itaconate is first formed with the hydrophobic ester radical linking the two carboxyl groups in the unconjugated positions. In one embodiment of this invention the bis-ester of the diol is then reacted with a base, such as potassium hydroxide and then a sulfo-ester precursor, such as propane sultone to provide a crosslinking polymerizable anionic surfactant. In another embodiment of this invention the bis-ester of the diol is polyalkoxylated in its alpha or conjugated carboxyl group-containing portions by means of a catalyst combination system to provide a crosslinking polymerizable nonionic surfactant. The preparative technique employing the combined catalyst system is more fully described in a co-pending application filed by Emmons and Frank of same date and assigned to a common assignee. The following reaction sequences are representative of the preparation of the compounds of this invention:

CROSSLINKING ANIONIC

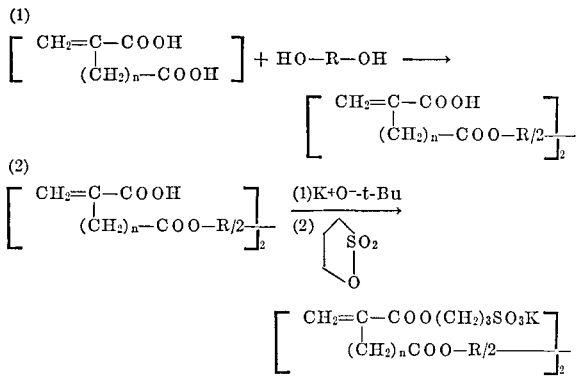

CROSSLINKING NONIONIC

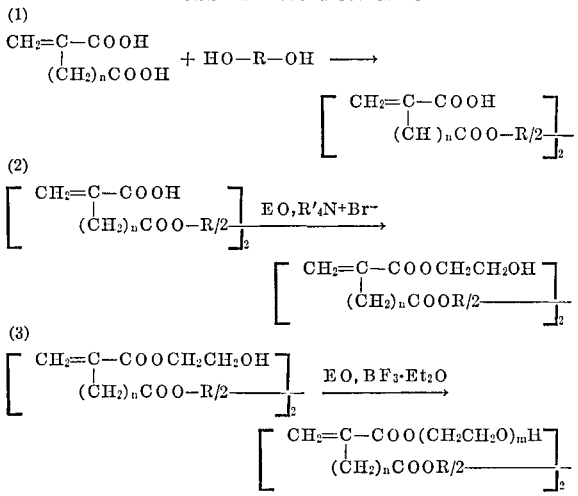

The compounds of this invention are incorporated into emulsion polymerization systems either with or without other emulsifying agents wherein they function as emulsion stabilizers and are copolymerized into the polymer chain to provide a stable latex of polymer particles comprising the polymerizable surfactant as an immobile integral component of the polymer. Emulsion polymers having the same backbone and particle size as emulsion polymers comprising the polymerizable surfactants of this invention do not possess the same desirable characteristics. For example, when air is blown through latices prepared with the compounds of this invention and similarly blown through latices prepared with conventional prior art emulsifiers, according to the procedure described below, the latices of this invention exhibit significantly lower foaming characteristics. The following Table I represents the results of a foaming test where latices of this invention (B and D) are compared with latices using conventional prior art emulsifiers (A and C). The degree of foaming is represented by the time required for the head of foam, generated by air bubbling through a 1 ml. orifice at 40 ml./min. rate, into 20 ml. of the emulsion placed in a 100 ml. graduated cylinder, to reach the 100 ml. mark.

The crosslinking polymerizable nonionic surfactants of this invention are incorporated into the polymer chain in a proportion from about 0.05 to about 1.0 weight percent, based on the weight of the monomer mixture. The crosslinking polymerizable anionic surfactants of this invention are incorporated into the polymer chain in a proportion from about 0.05 to about 5.0 weight percent, based on the weight of the monomer mixture. Polymer dispersions formed with the anionic surfactants of this invention exhibit good stability and an efficient separation of polymer particles because of a high local concentration, or bunching of ionic functionality on the particle surface.

TABLE I

| Latex | Emulsifying agent | Amount of foam | Total collapse of foam |
|---|---|---|---|
| A | 1 wt. percent sodium lauryl sulfate | 160 ml./90 sec | 150 |
| B | 1 wt. percent dodecanediol bis-(potassium sulfopropylitaconate). | 75 ml./600 sec | 60 |
| C | 6 wt. percent octylphenoxypolyethoxy-ethyleneglycol having 40 ethylene oxide units. | 100 ml./120 sec | 618 |
| D | 1 wt. percent polyoxyethylated dodecanediol bis-itaconate having 52 ethylene oxide units. | 80 ml./600 sec | 180 |

Additional support for the statement of the superior stability characteristics possessed by the latices formed with the compounds of this invention is based upon the behavior of latices A, B, C and D in Table I when each is independently mixed with a conventional electrolyte, such as diammonium phosphate. For example, when 2 cc. of a 15 percent solution of diammonium phosphate is mixed with 10 cc. of latex A or C, the latex-electrolyte mixture coagulates very rapidly upon standing in a period of about one hour. When 2 cc. of diammonium phosphate is mixed with 10 cc. of latex B or D, the latex-electrolyte mixture does not coagulate, even after 72 hours standing.

Representatives of the polymerizable dicarboxylic acids that may be used as starting materials are itaconic acid, α-methyleneglutaric acid, maleic acid, fumaric acid, and other polymerizable mono-olefinic discarboxylic acids.

Representatives of the polymerizable ethylenically unsaturated compounds that can be copolymerized with the polymerizable surface active compounds of this invention are ethylene, the styrene compounds, the ethylenically unsaturated acids and derivatives such as the acrylic and methacrylic acids and salts, acrylic and methacrylic esters, acrylic and methacrylic nitriles, acrylic and methacrylic amides, acrylic and methacrylic anhydrides, maleic esters, maleic anhydride, maleic acid polyesters, unsaturated alcohol esters, unsaturated ketones, unsaturated esters, and other compounds containing one or more ethylenic linkages capable of addition polymerization. Specific examples of such ethylencially unsaturated compounds are ethylene, styrene, α-methylstyrene, vinylnaphthalene, vinylbenzenesulfonic acid, hydroxystyrene, methoxystyrene, aminostyrene, cyanostyrene, acetylstyrene, monochlorostyrene, dichlorostyrene and other halostyrenes, acrylic acid and salts, methacrylic acid and salts, methyl methacrylate, ethyl acrylate, hexyl acrylate, lauryl methacrylate, phenyl acrylate, allyl acrylate, acrylonitrile, methacrylonitrile, acrylamide, methacrylamide, acrylanilide, acrylic anhydride, ethyl α-chloroacrylate, ethyl maleate, maleic anhydride, polyglycol maleate, diallyl fumarate, vinyl acetate, vinyl propionate, vinyl butyrate, vinyl benzoate, vinyl chloride, vinyl bromide, vinylidene chloride, vinylidene bromide, vinylidene cyanide, vinyl methyl ketone, methyl isopropenyl ketone, vinyl carbazole, vinyl ethyl ether, isobutylene, 1,3-butadiene, isoprene, and the like.

The improved latices of this invention may be prepared by conventional methods of emulsion polymerization. In most instances the starting composition is agitated and the temperature is raised, e.g., to a temperature in the range from 40° C. to 100° C. to activate the polymerization, although in some instances, particularly those wherein the composition comprises a very active polymerization catalyst, the polymerization can occur at or below room temperature.

The invention contemplates embodiments in which all of the constituents are charged to the starting mixture, and are polymerized therein in a single step, as well as embodiments in which the constituents are charged in a sequence, perhaps co-ordinated with a polymerization sequence, and/or the polymerization is carried out in pluarlity of stages.

The invention contemplates that the aqueous starting composition comprising the polymerizable material may contain polymerization catalysts of kinds already known to promote emulsion polymerizations. Among such catalysts are water-soluble oxidizing agents such as hydrogen peroxide and potassium persulfated and catalysts which, like the redox catalysts, are activated in the water-phase, e.g., by a water-soluble reducing agent.

The invention contemplates that the aqueous compositions may optionally contain conventional emulsifiers, wetting agents, surfactants, and the like, although such constituents can be omitted from the starting composition and, if used, can usually be employed in smaller proportions in accordance with this invention than is possible with known processes.

These aqueous dispersions are characteristically very stable, i.e., resistant to coagulation of the colloidally dispersed polymer particles, even though they contain little or no conventional emulsifier or stabilizer. In many instances, the polymer dispersions can be mixed with concentrated calcium chloride solutions without causing coagulation of the polymer. In many instances, the dispersion can be vigorously agitated without coagulation under conditions that causes substantial precipitation of ordinary dispersions. In instances where the dispersions contain little or no conventional water-soluble emulsifier, the dispersions often have little or no tendency to foam. When the polymer dispersions are obtained from starting compositions that were substantially free of water-soluble soaps, wetting agents, stabilizers, and like external solutes, the resulting polymer dispersions are likewise substantially free of such external solutes and are advantageously employed where such solutes are undesirable, e.g., in coatings that are resistant to water.

The latex products, i.e. aqueous polymer dispersions, obtained in accordance with this invention are useful for a number of purposes. For example, some of the latex dispersions are useful in the preparation of coating, impregnating and binding compositions, or in the coating of films and the like. Other compositions can be treated, e.g. by spray or other drying, to obtain a dry polymeric product useful in molding or for other purposes. The compounds of this invention may also be used as antistatic agents for textiles and plastics, as sizing agents and as dye assistants.

To assist those skilled in the art to practice the present invention, the following modes of operation are suggested by way of illustration, parts and percentages being by weight and the temperatures in degrees C. unless otherwise specifically noted.

(1a) To a mixture of 102 g. polypropylene glycol in about 100 ml. toluene is added about 26 g. itaconic acid, about 0.3% by weight concentrated sulfuric acid and about 500 p.p.m. of the monomethylether of hydroquinone. The mixture is heated at 110° C. for about 4 hours until the reaction is completed to form a bis-itaconate.

(1b) About 147 g. bis-itaconate (0.13 mole) formed as in procedure (1a) above is mixed with about 13 g. ethylene oxide (0.29 mole), about 0.6 g. tetrapropyl ammonium bromide (1 mole percent based on the weight of acid), about 0.2 g. 2,6-di-t-butyl-4-methylphenol (butylated hydroxytoluene—1000 p.p.m. based on the weight of acid) and about 160 g. benzene and the mixture is placed in a one-liter Parr bomb. The system is closed and heated, with stirring, at about 100° C. for about 5 hours. The reaction mixture is cooled to room temperature and about 4 g. boron trifluoride etherate ($BF_3 \cdot Et_2O$) is added. The system is again closed and the contents of the receptacle are heated to about 85° C. The temperature is maintained at about 85° C. and ethylene oxide is pumped into the bomb at the rate of 400 g. per hour, for a period of about 80 minutes. The reaction mixture is further heated at about 85° C. for an additional 30 minutes. The reaction mixture is cooled and concentrated to provide a polyoxyethylated-polypropylene glycol bis-itaconate having 31 ethylene oxide units.

(2) About 43 g. of 1,12-dodecanediol bis-itaconate formed as in procedure (1a) above (0.12 mole) is mixed with about 11 g. ethylene oxide, about 0.6 g. tetrapropyl ammonium bromide (1 mole percent based on the weight of acid) about 0.05 g. 2,6 - di-t-butyl-4-methyl-phenol (butylated hydroxytoluene—1000 p.p.m. based on the weight of acid) and about 112 g. benzene and the mixture is placed in a one-liter Parr bomb. The system is closed and heated, with stirring, at about 100° C. for about 5 hours. The reaction mixture is cooled to room temperature and about 4 g. boron trifluoride etherate ($BF_3 \cdot Et_2O$) is added. The system is again closed and the contents of the receptacle are heated to about 85° C. The temperature is maintained at about 85° C. and ethylene oxide is pumped into the bomb at the rate of 400 g. per hour, for a period of about 80 minutes. The reaction mixture is further heated at about 85° C. for an additional 30 minutes. The reaction mixture is cooled and concentrated to provide a polyoxyethylated dodecanediol bis-itaconate having 26 ethylene oxide units. The final product has a saponification number of 87.5 and a bromine number of 11.5.

(3a) A mixture of about 22 g. itaconic anhydride, about 20 g. 1,12-dodecanediol in about 60 ml. of chloroform is refluxed for about 90 minutes in the presence of about 1 mole percent p-toluenesulfonic acid. After the reaction is completed, the reaction mixture is cooled to about 5° C. and filtered to provide about 38 g. of white crystalline 1,12-dodecanediol bis-itaconate having a melting point of 115–120° C.

(3b) About 43 g. of the bis-itaconate formed in (3a) above, 22 g. of solid potassium tert-butoxide, and about 200 ml. of tert-butanol are mixed and heated to reflux. About 24 g. propane sultone is added and the reaction mixture is further refluxed for about 90 minutes. The reaction mixture is cooled to about 5° C. and filtered to provide about 75 g. of white crystalline 1,12-dodecanediol bis-(potassium sulfopropylitaconate).

(4) A monomer emulsion consisting of about 90 g. ethyl acrylate (EA), 108 g. methyl methacrylate (MMA), 2 g. methacrylic acid (MAA), 2 g. polyoxyethylated dodecanediol bis-itaconate having 52 ethylene oxide units (POEDDBI—1% by weight of total monomer) and about 367 g. deionized water is sparged with nitrogen for about 20 minutes. Polymerization is initiated at about 24° C. with about 1 g. ammonium persulfate, 1 g. sodium metabisulfite, and 4 ml. of $FeSO_4$ solution freshly prepared from 0.18 g. of $FeSO_4$ in 100 ml. of water. After completion, the emulsion is allowed to cool to provide about 34% solids of a EA/MMA/MAA/POEDDBI polymer. The pH of the latex at 25° C. is about 2.4 and the particle size (1:500 dilution) is about 39.5 (percent, by light scatter).

The compounds of this invention may be used as polyfunctional reactants that serve to provide crosslinking action when mixed in a proportion of up to about 20 percent by weight, based on the weight of the monomeric mixture, with other ethylenically unsaturated copolymerizable monomers, such as styrene. The crosslinking action of the compounds of this invention may be supplemented by the presence of polyfunctional reactants, such as divinylbenzene.

(5) To about 67 g. of refluxing toluene is added, over a two-hour period, a mixture of about 90 g. styrene (S), 10 g. polyoxyethylated dodecanediol bis - itaconate (POEDDBI) having 52 ethylene oxide units and 1 g. benzoyl peroxide (1% based on the monomer weight).

Three successive 0.2 g. portions of benzoyl peroxide are added hourly to recatalyze the reaction and complete polymerization. About 167 g. toluene is added to the polymerization product to provide a final solids content of about thirty percent S/POEDDBI polymer.

(6) To a monomer mixture consisting of about 20 g. ethyl acrylate (EA), 10 g. methyl methacrylate (MMA), about 0.4 g. methacrylic acid (MAA), about 183 g. deionized water, about 0.15 g. of 1,12-dodecanediol bis-(potassium sulfopropylitaconate) is added about 0.9 g. potassium persulfate and polymerization is initiated at about 74° C. The polymerization is continued at about 80° C. for about 30 minutes. To the reaction mixture is gradually added, over a two hour period, a monomer emulsion consisting of about 178 g. EA, 89 g. MMA, 3.5 g. MAA, about 183 g. deionized water, and about 2.9 g. 1,12-dodecanediol bis-(potassium sulfopropylitaconate). After the gradual addition of monomers, the latex is maintained at about 80° C. for about 30 minutes to provide a polymer of EA/MMA/MAA having a solids content of about 44%, a pH at 25° C. of 2.7 and a particle size (1:500 dilution) of about 57.7 (percent, by light scatter).

It is to be understood that changes and variations may be made without departing from the spirit and scope of the invention as defined by the appended claims.

What is claimed is:

1. A compound having the formula

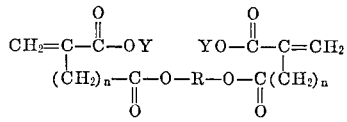

wherein $n$ is 1 or 2, R is a $C_2$ to $C_{24}$ divalent alkyl radical or a radical of the formula $$\{CH_2CH(CH_3)O\}_xCH_2CH(CH_3)-$$

wherein $x$ is an integer from 1 to 29, and Y is a radical of the formula $\{CH_2\}_mSO_3M$ or of the formula $$\{CH_2CH_2O\}_{m'}H$$

wherein $m$ is an integer from 2 to 4, $m'$ is an integer from 1 to 50, and M is hydrogen or an alkali metal.

2. A compound as defined in claim 1 wherein $n$ is 1, R is $-C_{12}H_{24}-$, and Y is a radical of the formula $\{CH_2CH_2O\}_{m'}H$, wherein $m'$ is an integer from 1 to 50.

3. A compound as defined in claim 1 wherein $n$ is 2, R is $-C_{12}H_{24}-$, and Y is a radical of the formula $\{CH_2CH_2O\}_{m'}H$, wherein $m'$ is an integer from 1 to 50.

4. A compound as defined in claim 1 wherein $n$ is 1, R is a radical of the formula $$\{CH_2CH(CH_3)O\}_xCH_2CH(CH_3)$$

wherein $x$ is an integer from 1 to 29, and Y is a radical of the formula $\{CH_2CH_2O\}_{m'}H$, wherein $m'$ is an integer from 1 to 50.

5. A compound as defined in claim 1 wherein $n$ is 1, R is a radical of the formula $$\{CH_2CH(CH_3)O\}_xCH_2CH(CH_3)$$

wherein $x$ is an integer from 1 to 29, and Y is a radical of the formula $\{CH_2\}_mSO_3M$ wherein $m$ is an integer from 2 to 4 and M is hydrogen or an alkali metal.

References Cited

UNITED STATES PATENTS 2,386,445  10/1945  De Groote et al. _____ 260—485
3,459,733   8/1969  Byrd et al. _____ 260—485

JAMES A. PATTEN, Primary Examiner

E. J. SKELLY, Assistant Examiner

U.S. Cl. X.R.

252—8.6; 260—29.6, 78.5